US010819515B1

(12) United States Patent
Griffin et al.

(10) Patent No.: US 10,819,515 B1
(45) Date of Patent: Oct. 27, 2020

(54) DERIVED UNIQUE RECOVERY KEYS PER SESSION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 252 days.

(21) Appl. No.: 15/917,154

(22) Filed: Mar. 9, 2018

(51) Int. Cl.
*H04L 9/08* (2006.01)
*G06F 21/72* (2013.01)
*H04L 9/06* (2006.01)

(52) U.S. Cl.
CPC ............ *H04L 9/0894* (2013.01); *G06F 21/72* (2013.01); *H04L 9/0841* (2013.01); *H04L 9/0643* (2013.01)

(58) Field of Classification Search
CPC ... H04L 9/0894; H04L 9/0841; H04L 9/0643; G06F 21/72
See application file for complete search history.

(56) References Cited

U.S. PATENT DOCUMENTS

| | | | | |
|---|---|---|---|---|
| 5,937,066 A * | 8/1999 | Gennaro | ............... | H04L 9/0841 380/286 |
| 6,775,382 B1 * | 8/2004 | Al-Salqan | ............. | H04L 9/0894 380/280 |
| 7,773,754 B2 * | 8/2010 | Buer | ..................... | G06F 21/602 380/277 |
| 8,245,050 B1 * | 8/2012 | Subramanian | ...... | H04L 63/0428 380/277 |
| 2005/0195975 A1 * | 9/2005 | Kawakita | .............. | H04L 9/0825 380/30 |
| 2007/0266236 A1 * | 11/2007 | Colditz | ............... | H04L 63/0428 713/153 |
| 2007/0280483 A1 * | 12/2007 | Fu | .......................... | H04L 9/0822 380/286 |
| 2009/0106551 A1 * | 4/2009 | Boren | ................... | H04L 9/0822 713/158 |
| 2009/0217035 A1 * | 8/2009 | Abdul Hameed Khan | ................ | G06F 21/31 713/168 |

(Continued)

FOREIGN PATENT DOCUMENTS

| | | | | |
|---|---|---|---|---|
| EP | 2244420 A1 * | 10/2010 | ........... | H04L 63/061 |
| KR | 20130114030 A * | 10/2013 | ............... | H04L 9/08 |

*Primary Examiner* — Shanto Abedin
*Assistant Examiner* — Kalu Kelly Emeaba
(74) *Attorney, Agent, or Firm* — Foley & Lardner LLP

(57) ABSTRACT

Examples described herein relate to systems, apparatuses, methods, and non-transitory computer-readable medium for recovering a session object associated with a secure session established by a security protocol server, including receiving, by a recovery server, an encrypted session object from the security protocol server, wherein the encrypted session object is unique to the secure session, generating, by the recovery server, a recovery key based on a first initial key and a recovery key sequence number, wherein the recovery key sequence number corresponds to a number of times that secure sessions have been established since the first initial key is received by the security protocol server, and decrypting, by the recovery server, the encrypted session object using the recovery key to generate the session object associated with the secure session.

23 Claims, 5 Drawing Sheets

(56) References Cited

U.S. PATENT DOCUMENTS

| | | | | |
|---|---|---|---|---|
| 2010/0332836 A1* | 12/2010 | Shen | ................... | H04L 63/0435 |
| | | | | 713/171 |
| 2011/0238989 A1* | 9/2011 | Machani | ............... | H04L 9/0637 |
| | | | | 713/168 |
| 2012/0213358 A1* | 8/2012 | Dror | ....................... | G06F 7/588 |
| | | | | 380/28 |
| 2015/0110274 A1* | 4/2015 | Ponceleon | ............ | H04L 9/0822 |
| | | | | 380/278 |
| 2017/0310655 A1* | 10/2017 | Sethi | ................... | H04L 12/4633 |

* cited by examiner

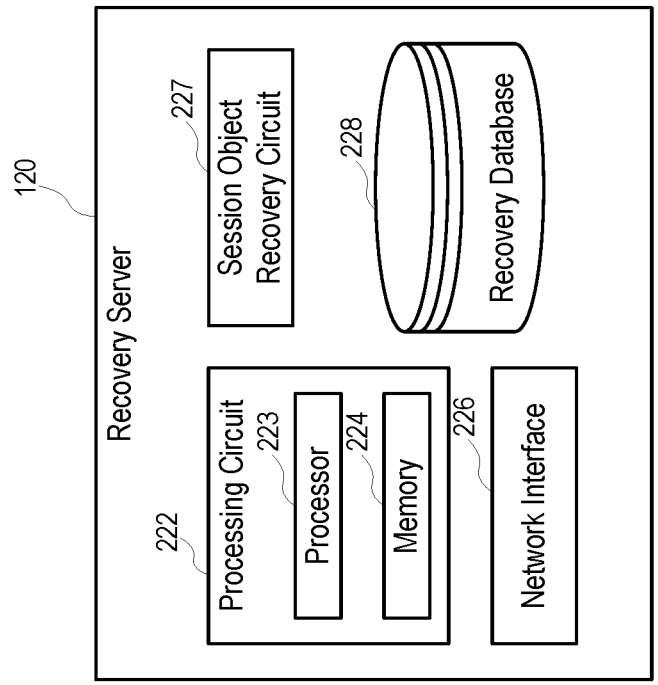
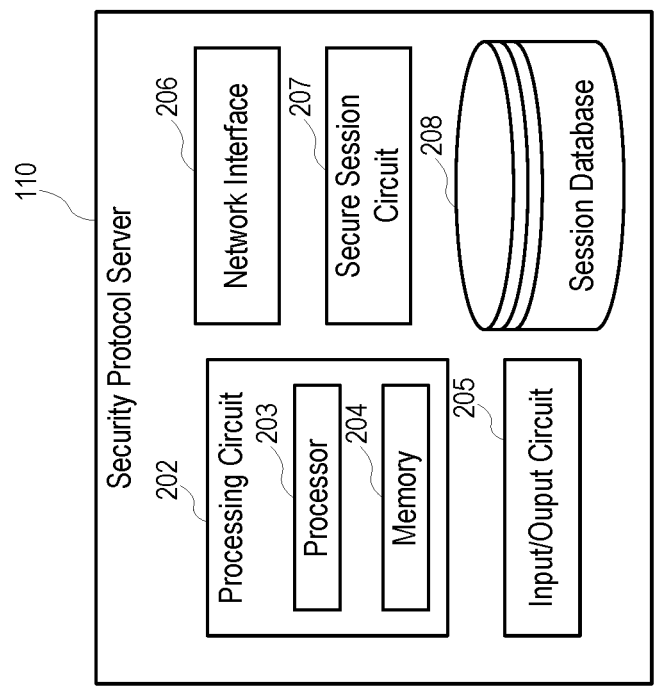
FIG. 2B
FIG. 2A

US 10,819,515 B1

DERIVED UNIQUE RECOVERY KEYS PER SESSION

BACKGROUND

Ephemeral keys exist only for a moment in time (e.g., seconds) and are unique per session whereas static keys are used for more than one session over time.

SUMMARY

Arrangements disclosed herein relate to systems, apparatuses, methods, and non-transitory computer-readable medium for recovering a session object associated with a secure session established by a security protocol server, including but not limited to, establishing the secure session, wherein the session object is associated with the secure session, generating a recovery key from a first initial key based on a recovery key sequence number, encrypting the session object with the recovery key to generate an encrypted session object, and sending, by the security protocol server, the encrypted session object to the recovery server for recovery. The recovery key is unique to the secure session. The recovery key sequence number corresponds to a number of times that secure sessions have been established since the first initial key is received from a recovery server.

In some arrangements, a security protocol server includes a network interface and a processing circuit configured to establish a secure session, the session object is associated with a secure session established by the security protocol server, generate a recovery key from a first initial key based on a recovery key sequence number, wherein the recovery key is unique to the secure session, and the recovery key sequence number corresponds to a number of times that secure sessions have been established since the first initial key is received from a recovery server, encrypt the session object with the recovery key to generate an encrypted session object, and send the encrypted session object to the recovery server for recovery.

In some arrangements, a non-transitory computer-readable medium of a security protocol server stores computer-readable instructions such that, when executed, causes a processor to establish a secure session, the session object is associated with a secure session established by the security protocol server, generate a recovery key from a first initial key based on a recovery key sequence number, the recovery key is unique to the secure session, and the recovery key sequence number corresponds to a number of times that secure sessions have been established since the first initial key is received from a recovery server, encrypt the session object with the recovery key to generate an encrypted session object, and send the encrypted session object to the recovery server for recovery.

In some arrangements, a method is described for recovering a session object associated with a secure session established by a security protocol server includes receiving an encrypted session object from the security protocol server, the encrypted session object is unique to the secure session, generating a recovery key based on a first initial key and a recovery key sequence number, the recovery key sequence number corresponds to a number of times that secure sessions have been established since the first initial key is received by the security protocol server, and decrypting the encrypted session object using the recovery key to generate the session object associated with the secure session.

In some arrangements, a recovery server includes a network interface and a processing circuit configured to receive an encrypted session object from a security protocol server, wherein the encrypted session object is unique to a secure session established by the security protocol server, generate a recovery key based on a first initial key and a recovery key sequence number, wherein the recovery key sequence number corresponds to a number of times that secure sessions have been established since the first initial key is received by the security protocol server, and decrypt the encrypted session object using the recovery key to generate the session object associated with the secure session.

In some arrangements, a non-transitory computer-readable medium of a recovery server stores computer-readable instructions such that, when executed, causes a processor to receive an encrypted session object from a security protocol server, the encrypted session object is unique to a secure session established by the security protocol server, generate a recovery key based on a first initial key and a recovery key sequence number, the recovery key sequence number corresponds to a number of times that secure sessions have been established since the first initial key is received by the security protocol server, and decrypt the encrypted session object using the recovery key to generate the session object associated with the secure session.

These and other features, together with the organization and manner of operation thereof, will become apparent from the following detailed description when taken in conjunction with the accompanying drawings.

BRIEF DESCRIPTION OF THE FIGURES

FIG. 2A is a diagram of an example of a security protocol server, according to some arrangements.

FIG. 2B is a diagram of an example of a recovery server, according to some arrangements.

DETAILED DESCRIPTION

Referring generally to the FIGS., arrangements described herein relate to apparatuses, systems, methods, and non-transitory computer-readable medium for a derived unique recovery keys per session (DURKPS) mechanism, which is implemented on a cryptographically secure backup and recovery system for session objects such as but not limited to, ephemeral keys. Such mechanism can recover a session object associated with a secure session and re-negotiate with a key agreement scheme with respect to the session object. The backup and recovery mechanism can fulfill network operational requirements for security protocols such as but not limited to, Hypertext Transfer Protocol Secure (HTTPS), Transport layer Security (TLS), and Internet Protocol security (IPsec). While TLS may be used throughout the disclosure as an example of a secure session, one of ordinary skill in the art can appreciate that other security sessions can likewise implement the DURKPS mechanism. Examples of the key agreement schemes include but are not limited to, Diffie-Hellman Ephemeral (DHE) and ephemeral elliptic curve Diffie-Hellman (ECDHE) schemes.

In some arrangements, the DURKPS mechanism can generate a recovery key for a given secure session using only a unique identifier and a base key. The unique identifier and the base key can support thousands or millions of secure sessions on that security protocol server. Thus, the recovery server does not need to have a unique set of recovery keys (e.g., DHE recovery keys) for every secure session. As such, management cost of the DURKPS mechanism is low. In addition, the DURKPS mechanism is a symmetric mechanism that can be executed tremendously faster than asymmetric mechanisms, for example, by a factor of 10. Furthermore, the advents of quantum computers can render asymmetric mechanisms unviable. On the other hand, symmetric mechanisms such as the DURKPS mechanism for session object recovery can still be viable as post-quantum solutions.

Figure 1:
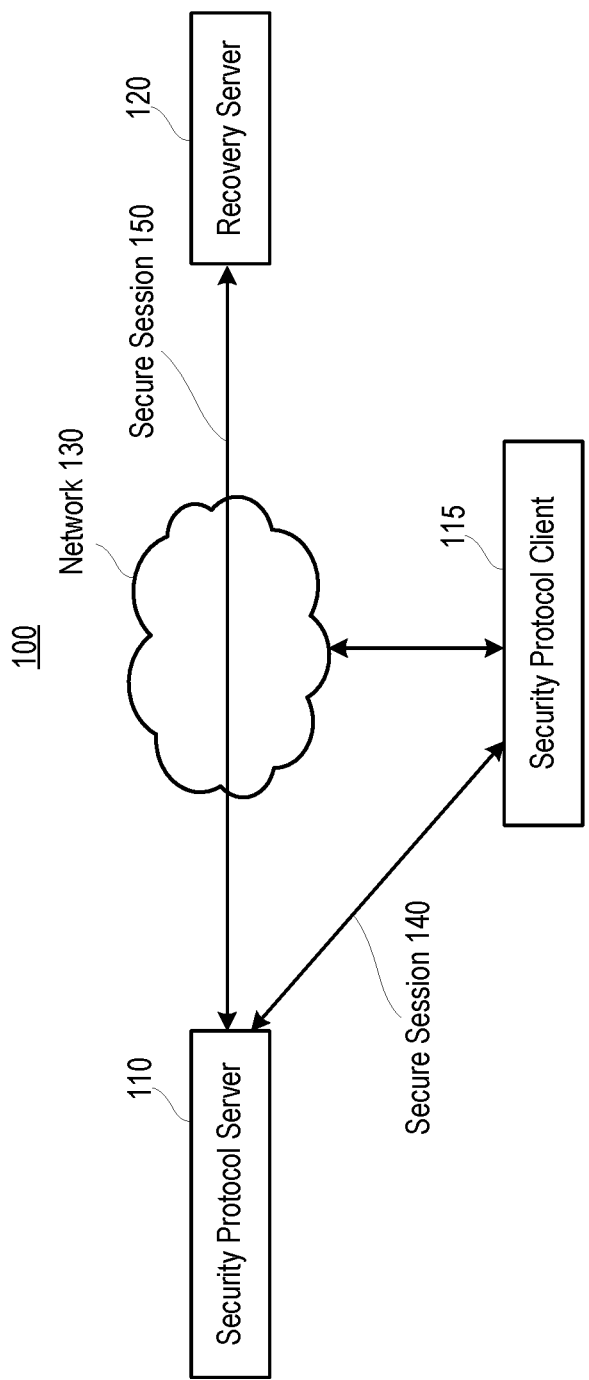
FIG. 1 is a diagram of a system for recovering a session object, according to some arrangements.

FIG. 1 is a diagram of a system 100 for recovering a session object, according to some arrangements. Referring to FIG. 1, the system 100 includes at least a security protocol server 110, a security protocol client 115, and a recovery server 120. Each of the security protocol server 110, security protocol client 115, and the recovery server 120 is a computing system having suitable processing, storage, and networking capabilities. In some arrangements, the recovery server 120 may be installed on the security protocol server 110 such that the connection between the recovery server 120 and the security protocol server 110 is local. In other arrangements, the recovery server 120 may be connected to the security protocol server 110 via a network as shown.

The security protocol server 110 and security protocol client 115 can engage in communications (e.g., transfer of data) over a network 130, for which a secure session 140 can be established for encryption. In some examples, the security protocol client 115 can be a point-of-sale (POS) device such as but not limited to, a mobile device, a smartphone, a laptop computer, a tablet, a desktop computer, an Automatic Teller Machine (ATM), and the like. In some examples, the security protocol client 115 can be located at a merchant location and is configured to process transactions. The security protocol server 110 can provide security protocols and sessions to the security protocol client 115. The examples of the security protocol server 110 and security protocol client 115 presented herein are not intended to be an exhaustive list of all possible implementations.

The session object is an artifact associated with the secure session 140 configured to enable the secure session 140 to be re-verified at a later time. In some arrangements, an encrypted session object can be transferred from the security protocol server 110 to the recovery server 120 in real time (e.g., the security protocol server 110 and the recovery server 120 are physically connected). For example, an administrator may go to a datacenter to troubleshoot an issue related to a corresponding session. In such arrangements, the re-verification can be performed in real time. The examples of the session object presented herein are not intended to be an exhaustive list of all possible implementations. The session object is used to refer to any information associated with the secure session 140 recoverable by the recovery server 120.

Examples of the secure session 140 include but are not limited to, a HTTPS session, a TLS session, an IPsec session, and the like. The secure session 140 can be established via suitable handshakes (e.g., key negotiations). As used herein, a session object refers to an encryption key (such as but not limited to, a static key, an asymmetric key, and an ephemeral key), a token, a certificate (such as but not limited to, a certificate of an asymmetric key), and the like. The session object can be generated or otherwise exchanged during the secure session 140.

The recovery server 120 is a computing system that can recover, store, and re-negotiate a session object associated with the secure session 140. For example, the recovery server 120 can receive and store an encrypted session object associated with the secure session 140. The recovery server 120 can derive a decryption key to decrypt the encrypted session object, and thus recovering the unencrypted session object. The recovery server 120 can then re-negotiate the session object with a key agreement scheme. Recovery (re-negotiation) can be performed by the recovery server 120 after the expiration of the session object.

The network 130 is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (lx), General Packet Radio Service (GPRS), Personal Communications Service (PCS), 802.11X, ZigBee, Bluetooth, Wi-Fi, any suitable wired network, combination thereof, and/or the like. The network 130 is structured to permit the exchange of data, values, instructions, messages, and the like. In some arrangements, communications between the security protocol server 110 and the recovery server 120 can be communicated via a dedicated secure session 150 separate from the secure session 140. The secure session 140 may or may not be established within the network 130.

FIG. 2A is a diagram of an example of the security protocol server 110 (FIG. 1), according to some arrangements. Referring to FIGS. 1-2A, the security protocol server 110 is shown to include various circuits and logic for implementing the operations described herein. More particularly, the security protocol server 110 includes one or more of a processing circuit 202, an input/output circuit 205, a network interface 206, a secure session circuit 207, and a session database 208. While various circuits, interfaces, and logic with particular functionality are shown, it should be understood that the security protocol server 110 includes any number of circuits, interfaces, and logic for facilitating the operations described herein. For example, the activities of multiple circuits are combined as a single circuit and implemented on a same processing circuit (e.g., the processing circuit 202), as additional circuits with additional functionality are included.

In some arrangements, the security protocol server 110 includes a processing circuit 202 having a processor 203 and a memory 204. The processor 203 can be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 204 stores data and/or computer code for facilitating the various processes described herein. The memory 204 can be implemented as Random Access Memory (RAM), Read-Only Memory (ROM), Non-volatile RAM (NVRAM), Flash Memory, hard disk storage, and the like. Moreover, the memory 204 is or includes tangible, non-transient volatile memory or non-volatile memory. Accordingly, the memory 204 includes database components, object code components, script components, or any other type of information structure for supporting the various activities and information structures described herein.

The input/output circuit 205 is configured to receive user input from and provide information to the user. In this regard, the input/output circuit 205 is structured to exchange data, communications, instructions, etc. with an input/output component of the security protocol server 110. Accordingly, in some arrangements, the input/output circuit 205 includes an input/output device such as a display device, touchscreen, keyboard, microphone, and/or the like. In some arrangements, the input/output circuit 205 includes communication circuitry for facilitating the exchange of data, values, messages, and the like between the input/output device and the components of the security protocol server 110. In some arrangements, the input/output circuit 205 includes machine-readable media for facilitating the exchange of information between the input/output device and the components of the security protocol server 110. In still another arrangement, the input/output circuit 205 includes any combination of hardware components (e.g., a touchscreen), communication circuitry, and machine-readable media.

The network interface 206 is configured for and structured to communicate data over the network 130. The network interface 206 is configured for and structured to communicate facilitate the establishment of the secure session 140. Accordingly, the network interface 206 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The secure session circuit 207 can be implemented with the processing circuit 202 in some arrangements. The secure session circuit 207 can establish secure sessions (e.g., the secure session 140) to between the security protocol server 110 and the security protocol client 115. The secure session circuit 207 can retain session objects associated with the secure sessions. In some arrangements, the secure session circuit 207 can receive a first initial key (e.g., $IK_0$ 304 of FIG. 3) from the recovery server 120, and apply a suitable number of iterations of a first function (F) to generate internal keys (e.g., $IK_1$ 306-$IK_N$ 310 of FIG. 3). With respect to each secure session (e.g., $TLS_1$ 311 of FIG. 3), a corresponding one of the internal keys is used as input to a second function (G) to generate a recovery key (e.g., $RK_1$ 314 of FIG. 3) used to encrypt a session object (e.g., $SO_1$ 312 of FIG. 3) associated with the secure session in order to generate an encrypted session object (e.g., $E_1$ 316 of FIG. 3). The number of times that the first function (F) is iterated is the same as a recovery key sequence number associated with the secure session, which corresponds to the internal key in the manner described. The secure session circuit 207 can configure the network interface 206 to send the encrypted session object for each secure session to the recovery server 120. The secure session circuit 207 can implement a counter that counts a number (e.g., a recovery key sequence number) of secure sessions established by the security protocol server 110 since the first initial key is received from the recovery server 120.

The session database 208 can store various objects related to secure sessions of the security protocol server 110. For example, the session database 208 can store any session objects associated with secure sessions of the security protocol server 110. The database 208 can store the internal keys before those internal keys are used to generate recovery keys. The session database 208 can further store the recovery keys before those recovery keys are used to encrypt the session objects. In some arrangements, the session database 208 stores the recovery key sequence number that corresponds to a number of times that secure sessions are established by the security protocol server 110, since the first initial key has been received from the recovery server 120.

FIG. 2B is a diagram of an example of the recovery server 120 of the system 100 set forth in FIG. 1, according to some arrangements. Referring to FIGS. 1-2B, the recovery server 120 is shown to include various circuits and logic for implementing the operations described herein. More particularly, the recovery server 120 includes one or more of a processing circuit 222, a network interface 226, a session object recovery circuit 227, and a recovery database 228. While various circuits, interfaces, and logic with particular functionality are shown, it should be understood that the recovery server 120 includes any number of circuits, interfaces, and logic for facilitating the operations described herein. For example, the activities of multiple circuits are combined as a single circuit and implemented on a same processing circuit (e.g., the processing circuit 222), as additional circuits with additional functionality are included.

In some arrangements, the processing circuit 222 has a processor 223 and a memory 224. The processor 223 can be implemented as a general-purpose processor, an ASIC, one or more FPGAs, a DSP, a group of processing components, or other suitable electronic processing components. The memory 224 stores data and/or computer code for facilitating the various processes described herein. The memory 224 can be implemented as RAM, ROM, NVRAM, Flash Memory, hard disk storage, or another suitable storage device. Moreover, the memory 224 is or includes tangible, non-transient volatile memory or non-volatile memory. Accordingly, the memory 224 includes database components, object code components, script components, or any other type of information structure for supporting the various activities and information structures described herein.

The network interface 226 is configured for and structured to establish connection with the security protocol server 110. The network interface 226 is structured for sending and receiving of data over a communication network (e.g., the network 130). Accordingly, the network interface 226 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The session object recovery circuit 227 can be implemented with the processing circuit 222 or a separate processing circuit. The session object recovery circuit 227 can cryptographically derive the first initial key (e.g., $IK_0$ 304 of FIG. 3) from a unique ID (e.g., unique ID 301 of FIG. 3) using an associated base key (e.g., BK 303 of FIG. 3). The session object recovery circuit 227 can configure the network interface 226 to send the first initial key to the security protocol server 110. The session object recovery circuit 227 can configure the network interface 226 to receive, from the security protocol server 110, at least an encrypted session object (e.g., $E_1$ 316 of FIG. 3) associated with a secure session (e.g., $TLS_1$ 311 of FIG. 3) of the security protocol server 110 and the unique ID. The session object recovery circuit 227 can derive the recovery key (e.g., $RK_1$ 314 of FIG. 3) based on the unique ID to decrypt the encrypted session object and recover the session object.

The recovery database 228 stores various parameters, values, and encrypted session objects for recovery (including re-negotiation) of session objects associated with secure sessions of the security protocol server 110. In some arrangements, the recovery database 228 stores relationships between each of unique IDs (identifying multiple security protocol servers) and corresponding base keys used to encrypt unique IDs to determine first initial keys. The recovery database 228 stores encrypted session objects, for example, if the encrypted session objects are to be recovered at a later time.

Figure 3:
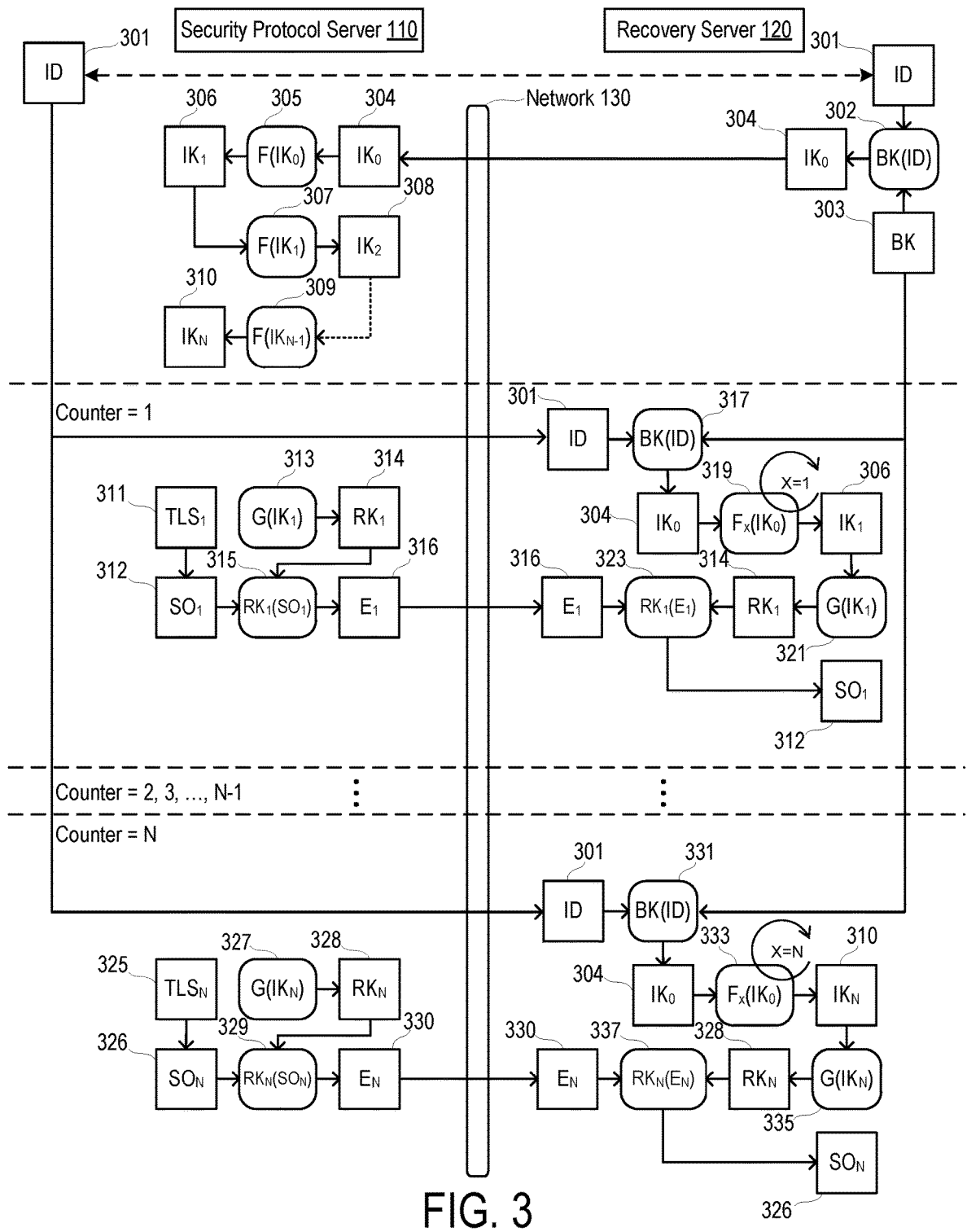
FIG. 3 is a flow diagram illustrating a method for recovering a session object, according to various arrangements.

FIG. 3 is a flow diagram illustrating a DURKPS method 300 for recovering a session object according to various arrangements. Referring to FIGS. 1-3, blocks having sharp corners denote information (data) such as but not limited to, parameters, values, objects, and the like. Blocks having rounded corners denote processes such as but not limited to, operations, functions, algorithms, and the like. The security protocol server 110, which is or includes a message system executing security protocols, cannot access parameters determined and stored by the recovery server 120 unless the parameters are sent to the security protocol server 110. For example, the security protocol server 110 cannot access parameters stored in the recovery database 228 unless received from the recovery server 120. The DURKPS method 300 can be used to recover session objects (e.g., session objects $SO_1$ 312 and $SO_N$ 326) in the manner described.

In some arrangements, two different functions can be implemented to recover a session object, which refers to an encryption key (such as but not limited to, a static key, an asymmetric key, and an ephemeral key), a token, a certificate (such as but not limited to, a certificate of an asymmetric key), and the like. A first function (F) can be an one-way function. Illustrating with a non-limiting example, the first function can be a Secure Hash Standard (FIPS 180-4), which defines a SHA-2 hash function (e.g., a SHA-256 hash function or a SHA-512 hash function) and a SHA-3 hash function. Illustrating with another non-limiting example, the first function can be a HMAC function (FIPS 198-1). A one-way function returns a result determined based on an input in a forward operation. In a reverse operation, it is computationally complex or almost impossible to use the one-way function to derive the input based on the result.

The first function can be iterated multiple times, each iteration corresponds to an additional secure session. The secure session circuit 207 can implement a first counter to record a number of times that the first function (F) is executed or a number of times that secure sessions have been established. The number of times that the first function (F) is executed is the same as the number of times that secure sessions have been established. For an Nth time that a secure session is being established, the first function (F) is executed N times with the first initial key as input, to determine an internal key corresponding to that secure session. Examples of the first function (F) include 305, 307, 309, 319, and 333. Each first function (F) 305, 307, 309, 319, and 333 can be a same function iterated one or more times such that the session objects can be synchronized and recovered between the security protocol server 110 and the recovery server 120. In some arrangements, the security protocol server 110 executes the first function (F) once per session to generate a next initial key based on a previously generated initial key, which was also generated using the first function (F) in a previous session. In some arrangements, the recovery server 120 executes the first function (F) based on the first initial key (e.g., $IK_0$ 304) x number of times per session, where x is the counter that counts the number (e.g., the recovery key sequence number) of secure sessions established by the security protocol server 110. As such, x is defined by the security protocol server 110.

A second function (G) can be used for forward secrecy and prevents discovery of any intermediary values (e.g., the internal keys) and the original input based on which the intermediary values are determined. In some arrangements, the second function is a one-way function. In some arrangements, the second function is a one-way hash function. Illustrating with a non-limiting example, the first function can be a Secure Hash Standard (FIPS 180-4), which defines a SHA-2 hash function (e.g., a SHA-256 hash function or a SHA-512 hash function) and a SHA-3 hash function. Illustrating with another non-limiting example, the first function can be a HMAC function (FIPS 198-1).

In some arrangements, the security protocol server 110 and the recovery server 120 executes the second function (G) one time for a given session, using an internal key as input to determine a recovery key unique to that session. In other arrangements, each of the security protocol server 110 and the recovery server 120 executes the second function (G) two or more times. In such arrangements, a second counter records the number of iterations that the second function (G) is executed for a given session. The second counter can be transmitted to the recovery server 120 with a corresponding encrypted session object such that the recovery server 120 can have knowledge of the number of iterations that the second function (G) is executed, if that number is not 1 by default. The second function (G) is different from the first function (F). Although the second function (G) may be the same as the first function (F) in some arrangements, such arrangements may not be preferred as the result of the second function (G) may be the same as the next internal key. Examples of the second function (G) include but are not limited to, 313, 321, 327, and 335. Each first function (F) 313, 321, 327, and 335 can be a same function such that the session objects can be synchronized and recovered between the security protocol server 110 and the recovery server 120.

A unique ID 301 can be shared between the recovery server 120 and the security protocol server 110. The unique ID 301 can be any suitable identifier that uniquely identifies one or more of the security protocol server 110, the recovery server 120, a dedicated static asymmetric key pair associated with the security protocol server 110, and the like. The dedicated static asymmetric key pair may or may not be encapsulated within an X.509 or equivalent PKI credentials. In some arrangements, the recovery server 120 defines (e.g., assigns the unique ID 301. The recovery server 120 can install the unique ID 301 on the security protocol server 110. In that regard, the unique ID 301 can be a device identifier that is assigned by the recovery server 120 to the security protocol server 110 in suitable initiation or registration phase, given that the recovery server 120 can manage recovery (including re-negotiation) for multiple devices. In other arrangements, the security protocol server 110 defines the unique ID 301, and the recovery server 120 receives and registers the unique ID 301 from the security protocol server 110. In such arrangements, the device identifier is designated by the security protocol server 110. The Unique ID 301 can be communicated via the network 130 in some arrangements. In other arrangements, unique ID 301 can be communicated via an out-of-network data exchange. The examples of assigning the unique ID 301 presented herein are not intended to be an exhaustive list of all possible implementations. The security protocol server 110 can store the unique ID 301 in the session database 208.

The recovery server 120 (e.g., the session object recovery circuit 227) executes a cryptographic process BK(ID) 302 to encrypt unique ID 301 with a base key (BK) 303, to obtain a first initial key $IK_0$ 304. In other arrangements, other schemes can be used to create the first initial key $IK_0$ 304. The BK 303 can be stored in the recovery database 228. The recovery database 228 can store multiple unique IDs, each associated with a device and a BK. Unique IDs and the associated BKs may be associated with devices other than the security protocol server 110, as the recovery server 120 can recover session objects for multiple different devices and message systems. A lookup table indicating relationships or mapping between unique IDs (e.g., unique ID 301) and associated BKs (e.g., BK 303) may be stored in the recovery database 228.

The session object recovery circuit 227 configures the network interface 226 to send $IK_0$ 304 to the security protocol server 110 via the network 130. $IK_0$ 304 can be sent to the security protocol server 110 in some secure fashion such as but not limited to, a TLS (different from $TLS_1$ 311) and a cable injection. Responsive to $IK_0$ 304 being sent to the security protocol server 110 or responsive to receiving a confirmation message from the security protocol server 110 that the security protocol server 110 has received $IK_0$ 304, the session object recovery circuit 227 erases the first initial key $IK_0$ 304.

The secure session circuit 207 executes a first function $F(IK_0)$ 305 using $IK_0$ 304 as input, and outputs an internal key $IK_1$ 306. $IK_1$ 306 is associated with a first security session $TLS_1$ 311. Responsive to determining that $IK_1$ 306 is generated, the secure session circuit 207 erases the first initial key $IK_0$ 304. Given that $F(IK_0)$ 305 is an one-way function, it is extremely difficult or impossible for a malign entity to derive $IK_0$ 304 using $IK_1$ 306, assuming that the malign entity intercepts $IK_1$ 306.

The secure session circuit 207 can execute the same first function (F) repetitively (e.g., at 307, . . . , 309) to generate additional internal keys (e.g., $IK_2$ 308 . . . , $IK_N$ 310). For example, $IK_1$ 306 can be used as input to the first function $F(IK_1)$ 307 to generate the next internal key $IK_2$ 308. $IK_{N-1}$ (not shown) can be used as input to the first function $F(IK_{N-1})$ 309 to generate the next internal key $IK_N$ 310. In some arrangements, the secure session circuit 207 can repetitively execute the same first function (F) multiple times to generate a sequence of multiple internal keys (e.g., 306, 308, and 310) in advance before a corresponding security session (e.g., $TLS_1$ 311, . . . , and $TLS_N$ 325) has been initiated or established, to have such internal keys in reserve. For example, $IK_N$ 310 can be generated before a corresponding secure session $TLS_N$ 325 is initiated or established.

The sequence of the internal keys 306, 308, and 310 can correspond to the sequence of secure sessions initiated or established by the secure session circuit 207. A key count (1, 2, . . . , N) of each internal key equals to the number of iterations that the first function (F) is executed (taking the first initial key $IK_0$ 304 as input) in order to generate that internal key. An internal key is used for a secure session having a recovery key sequence number equal to the key count of the internal key. For example, $IK_1$ 306 (key count 1) is associated with $TLS_1$ 311 (recovery key sequence number 1). $IK_2$ 308 (key count 2) is associated with $TLS_2$ (recovery key sequence number 2), which is not shown. $IK_N$ 310 (key count N) is associated with $TLS_N$ 325 (recovery key sequence number N). The internal keys that have been generated in advance can be stored in the session database 208. Given that the internal keys are unused and disassociated from any sensitive data, there is no security risk to store those internal keys in advance. The generation of the internal keys, including the repeated execution of first function (F), can be queued up using spare cycles. In some arrangements, once a next internal key (e.g., IK7) is generated, a previous initial key (e.g., IK6) is deleted by the secure session circuit 207.

In other arrangements, the internal keys can be generated on an on-demand basis. That is, responsive to the secure session circuit 207 determining that a corresponding secure session (e.g., the $TLS_N$ 325) has been initiated, the secure session circuit 207 can generate a corresponding internal key (the internal key $IK_N$ 310) by executing the first function $F(IK_{N-1})$ 309 with $IK_{N-1}$ as input (if $IK_{N-1}$ has not been erased), or by executing the first function (F) N times with $IK_0$ 304 as input (if $IK_0$ 304 has not been erased). Thus, to generate $IK_N$ 310 on an on-demand basis, at least one of $IK_0$ 304 $IK_{N-1}$ is stored in the session database 208 to save an input to one or more iterations of the first function (F).

In some arrangements, for a given first initial key (e.g., $IK_0$ 304) received by the security protocol server 110 from the recovery server 120, a limited number (L) of internal keys (e.g., $IK_1$ 306, $IK_2$ 308, . . . , $IK_N$ 310) can be generated by repeating the first function (F). The number (L) may be defined by a capacity of the counter (e.g., a 64-bit counter). Upon determining that the number of internal keys generated based on the first initial key equals to the threshold (L), the secure session circuit 207 can request from the recovery server 120 a new first initial key, which can be determined by the session object recovery circuit 227 based on a different unique ID, a different BK, or both. In other arrangements, the session object recovery circuit 227 can determine a new first initial key sua sponte, for example periodically, such that the method 300 restarts at 302.

The secure session circuit 207 initiates and creates the first security session ($TLS_1$ 311). $TLS_1$ 311 is the first security session that the secure session circuit 207 executes after the first initial key $IK_0$ 304 is received by the security protocol server 110. In other words, $TLS_1$ 311 is the first security session to use an internal key (e.g., $IK_1$ 306, $IK_2$ 308, . . . , $IK_N$ 310) that is a derivative of the first initial key (e.g., $IK_0$ 304).

A session object $SO_1$ 312 is associated with the $TLS_1$ 311. $SO_1$ 312 can be associated with the security protocol server 110 or received from another device with which the $TLS_1$ 311 is established, during suitable handshake mechanisms. Examples of $SO_1$ 312 include but are not limited to, an ephemeral key, certificates of asymmetric keys, and the like. Responsive to determining that $TLS_1$ 311 is initiated, the secure session circuit 207 executes a second function $G(IK_1)$ 313 with $IK_1$ 306 as input, and outputs a recovery key $RK_1$ 314. Given that $TLS_1$ 311 is the first security session since $IK_0$ is received from the recovery server 120 (recovery key sequence number of $TLS_1$ 311 is 1), the input to the second function $G(IK_1)$ 313 is $IK_1$ 306 because the key count of $IK_1$ 306 is also 1 (the same as the recovery key sequence number of $TLS_1$ 311). Responsive to determining that a recovery key (e.g., $RK_1$ 314) is generated, the secure session circuit 207 erases a corresponding internal key (e.g., $IK_1$ 306) based on which the recovery key is generated. In this regard, the security protocol server 110 does not store used internal keys and instead stores only unused initial keys.

The secure session circuit 207 executes an encryption process $RK_1(SO_1)$ 315 to encrypt $SO_1$ 312 with $RK_1$ 314, to obtain an encrypted session object $E_1$ 316, which is a cryptogram. In some arrangements, an encrypted session object such as $E_1$ 316 can be defined in a ASN.1 format. For example, an encrypted session object can include at least a session ID, a timestamp, and static key information. The session ID identifies a corresponding secure session (e.g., $TLS_1$ 311) associated with the encrypted session object (e.g., $E_1$ 316). The session ID may be created during TLS negotiation and handshake. In some arrangements, the session ID is different from a recovery key sequence number. In other arrangements, the session ID is the recovery key sequence number, or can at least function as a proxy for the recovery key sequence number. The timestamp defines a generation time of the unencrypted session object (e.g., $SO_1$ 312), a generation time of the encrypted session object (e.g., $E_1$ 316), or initiation time of the secure session (e.g., $TLS_1$ 311). The static key information refers to a static key associated with the recovery server 120.

In some arrangements, responsive to determining that an encrypted session object (e.g., $E_1$ 316) is generated, the secure session circuit 207 erases the corresponding recovery key (e.g., $RK_1$ 314) based on which the unencrypted session object (e.g., $SO_1$ 312) is encrypted. In this regard, the security protocol server 110 does not store used recovery keys.

The secure session circuit 207 configures the network interface 206 to send $E_1$ 316 and the unique ID 301 to the recovery server 120 to be received by the network interface 226. The session object recovery circuit 227 can immediately decrypt $E_1$ 316 to recover $SO_1$ 312 in some examples, upon receiving $E_1$ 316. In other examples, the session object recovery circuit 227 can store $E_1$ 316 (with associated received parameters such as but not limited to, unique ID 301) in the recovery database 228 for a period of time before retrieving and decrypting $E_1$ 316 to recover $SO_1$ 312 at a later time.

The session object recovery circuit 227 can determine, based on unique ID 301, a corresponding base key (e.g., the BK 303) used to initially encrypt unique ID 301 at the encryption process BK(ID) 302. For instance, the session object recovery circuit 227 can query the lookup table stored in the recovery database 228 with the received unique ID 301 as input to determine the corresponding BK 303. Given that $IK_0$ 304 may have already been erased from the recovery server 120, the session object recovery circuit 227 executes an encryption process BK(ID) 317 (e.g., the same as 302) to encrypt unique ID 301 with the BK 303, to generate $IK_0$ 304.

The session object recovery circuit 227 executes the first function (F) one time (as shown in $F_x(IK_0)$ 319 where x=1) using the $IK_0$ 304 as input, to generate the internal key $IK_1$ 306, which was used by the security protocol server 110 to generate the recovery key $RK_1$ 314. The number of times (x) that the first function (F) is executed is equal to the recovery key sequence number of the secure session (e.g., $TLS_1$ 311) the security protocol server 110 executed.

In some arrangements, the secure session circuit 207 maintains a counter and sends the counter to the recovery server 120 with $E_1$ 316, such that the session object recovery circuit 227 has knowledge of the number of times (x) that the first function (F) should be executed, for example, at $F_x(IK_0)$ 319. The counter equals to the recovery key sequence number corresponding to the secure session associated with a given encrypted session object. As such, the counter equals to a number of times that the first function (F) is iterated in generating the internal key used to generate the encrypted session object.

The counter can be implemented in various suitable manners. In one example, the counter is transmitted explicitly as a value with the encrypted session object. In one example, the counter can be implicitly transmitted using the ASN.1 format in the manner described. In one example, a session ID associated with $TLS_1$ 311 can be used as a proxy for the counter. As such, the session ID can be sent to the recovery server 120. In yet another example, a timestamp defining generation time of the unencrypted session object (e.g., $SO_1$ 312), a generation time of the encrypted session object (e.g., $E_1$ 316), or initiation time of the secure session (e.g., $TLS_1$ 311) can be sent to the recovery server 120 with $E_1$ 316 as described. The timestamp can be used as a proxy for the counter. The examples of the counter presented herein are not intended to be an exhaustive list of all possible implementations.

The session object recovery circuit 227 executes a second function $G(IK_1)$ 321 with $IK_1$ 306 as input, and outputs the recovery key $RK_1$ 314. The session object recovery circuit 227 executes a decryption process $RK_1(ST1)$ 323 to decrypt the $E_1$ 316 with $RK_1$ 314, to determine $SO_1$ 312. Upon recovering $SO_1$ 312, the session object recovery circuit 227 can re-negotiate $SO_1$ 312.

For subsequent secure sessions with recovery key sequence numbers 2-N, session objects associated with those secure sessions can be similarly recovered by the sever 120. Taking a secure session with recovery key sequence number N (counter=N), the secure session circuit 207 initiates and creates a Nth security session ($TLS_N$ 325). $TLS_N$ 325 is the Nth security session that the secure session circuit 207 executes after the first initial key $IK_0$ 304 is received by the security protocol server 110. In other words, $TLS_N$ 325 is the Nth security session to use an internal key (e.g., $IK_N$ 310) that is a derivative of the first initial key (e.g., $IK_0$ 304).

A session object $SO_N$ 326 is associated with the $TLS_N$ 325. $SO_N$ 326 can be associated with the security protocol server 110 or received from another device with which the $TLS_1$ 311 is established, during suitable handshake mechanisms. Examples of $SO_N$ 326 include but are not limited to, an ephemeral key, certificates of asymmetric keys, and the like. Responsive to determining that $TLS_N$ 325 is initiated, the secure session circuit 207 executes a second function $G(IK_N)$ 327 with $IK_N$ 310 as input, and outputs a recovery key $RK_N$ 328. Given that $TLS_N$ 325 is the Nth security session since $IK_0$ is received from the recovery server 120 (recovery key sequence number of $TLS_N$ 325 is N), the input to the second function $G(IK_N)$ 327 is $IK_N$ 310 because the key count of $IK_N$ 310 is also N (the same as the recovery key sequence number of $TLS_N$ 325). Responsive to determining that a recovery key (e.g., $RK_N$ 328) is generated, the secure session circuit 207 erases a corresponding internal key (e.g., $IK_N$ 310) based on which the recovery key is generated. In this regard, the security protocol server 110 does not store used internal keys and instead stores only unused initial keys.

The secure session circuit 207 executes an encryption process $RK_N(SO_N)$ 329 to encrypt $SO_N$ 326 with $RK_N$ 328, to obtain an encrypted session object $E_N$ 330, which is a cryptogram. In some arrangements, an encrypted session object such as $E_N$ 330 can be defined in a ASN.1 format in the manner described.

In some arrangements, responsive to determining that an encrypted session object (e.g., $E_N$ 330) is generated, the secure session circuit 207 erases the corresponding recovery key (e.g., $RK_N$ 328) based on which the unencrypted session object (e.g., $SO_N$ 326) is encrypted. In this regard, the security protocol server 110 does not store used recovery keys.

The secure session circuit 207 configures the network interface 206 to send $E_N$ 330 and the unique ID 301 to the recovery server 120. The session object recovery circuit 227 can immediately decrypt $E_N$ 330 to recover $SO_N$ 326 in some examples, upon receiving $E_N$ 330. In other examples, the session object recovery circuit 227 can store $E_N$ 330 (with associated received parameters such as but not limited to, unique ID 301) in the recovery database 228 for a period of time before retrieving and decrypting $E_N$ 330 to recover $SO_N$ 326 at a later time.

The session object recovery circuit 227 can determine, based on unique ID 301, a corresponding base key (e.g., the BK 303) used to initially encrypt unique ID 301 at the encryption process BK(ID) 302. For instance, the session object recovery circuit 227 can query the lookup table stored in the recovery database 228 with the received unique ID 301 as input to determine the corresponding BK 303. Given that $IK_0$ 304 may have already been erased from the recovery server 120, the session object recovery circuit 227 executes an encryption process BK(ID) 331 (e.g., the same as 302) to encrypt unique ID 301 with the BK 303, to generate $IK_0$ 304.

The session object recovery circuit 227 executes the first function (F) N times (as shown in $Fx(IK_0)$ 333 where x=N) using the $IK_0$ 304 as input, to generate the internal key $IK_N$ 310, which was used by the security protocol server 110 to generate the recovery key $RK_N$ 328. The number of times (x) that the first function (F) is executed is equal to the recovery key sequence number of the secure session (e.g., $TLS_N$ 325) the security protocol server 110 executed.

In some arrangements, the secure session circuit 207 maintains a counter and sends the counter to the recovery server 120 with $E_N$ 330, such that the session object recovery circuit 227 has knowledge of the number of times (x) that the first function (F) should be executed, for example, at $Fx(IK_0)$ 333.

The session object recovery circuit 227 executes a second function $G(IK_1)$ 335 with $IK_N$ 310 as input, and outputs the recovery key $RK_N$ 328. The session object recovery circuit 227 executes a decryption process $RK_N(E_N)$ 337 to decrypt the $E_N$ 330 with $RK_N$ 328, to recover $SO_N$ 326. By the time that the recovery server 120 recovers $SO_N$ 326, $SO_N$ 326 may already have been expired or erased at the security protocol server 110 given that $SO_N$ 326 can be an ephemeral key. Upon recovering $SO_N$ 326, the session object recovery circuit 227 can re-negotiate $SO_N$ 326.

Accordingly, the DURKPS mechanism can generate a recovery key for a given secure session using only a unique ID and a BK. In the arrangements in which a BK is used to support one security protocol server, a unique ID and BK can support thousands or millions of secure sessions on that device. In some arrangements, a same BK can be used to support multiple security protocol servers, as the results (e.g., the first initial keys) of the encryption process BK(ID) can differ based on different unique IDs. In such arrangements, a same BK can support thousands or millions of secure sessions on thousands or millions of devices. Thus, the recovery server 120 does not need to have a unique set of recovery keys (e.g., DHE recovery keys) and an ephemeral key for every secure session. As such, management cost of the DURKPS mechanism is low. In addition, the DURKPS mechanism is a symmetric mechanism that can be executed tremendously faster than asymmetric mechanisms, for example, by a factor of 10. Furthermore, the advents of quantum computers can render asymmetric mechanisms unviable. On the other hand, symmetric mechanisms for session object recovery can still be viable as post-quantum solutions.

Figure 4:
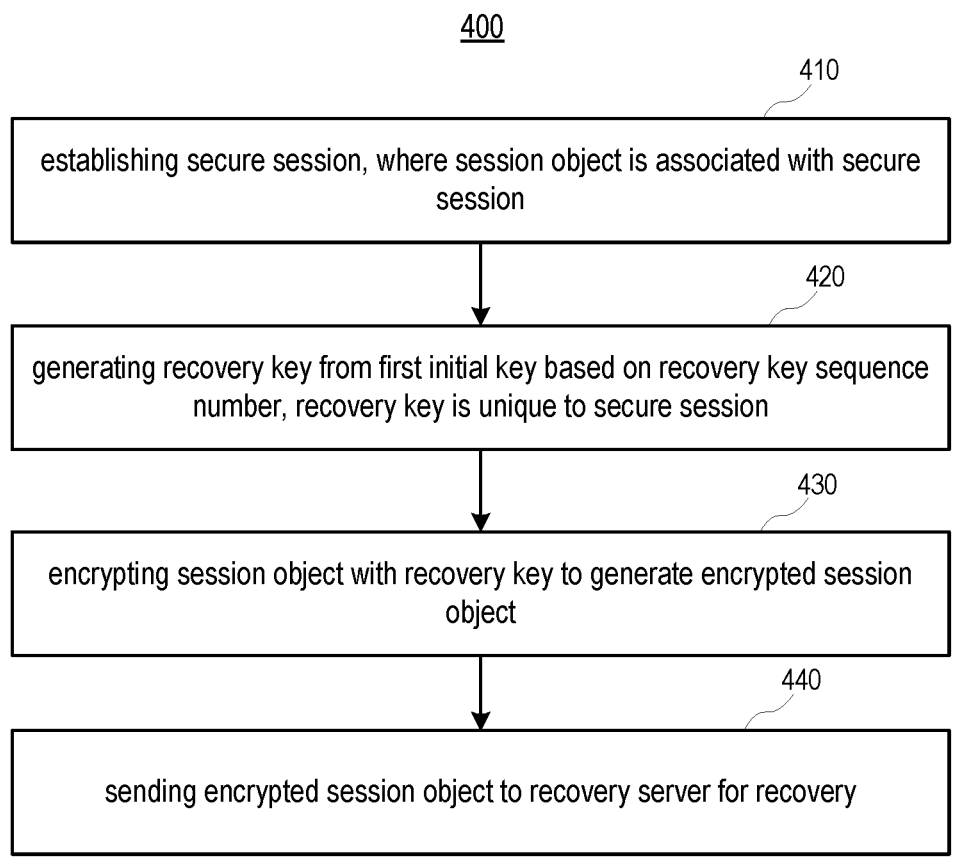
FIG. 4 is a flow diagram illustrating a method for recovering a session object, according to various arrangements.

FIG. 4 is a flow diagram illustrating a method 400 for recovering a session object, according to various arrangements. Referring to FIGS. 1-4, the method 400 is executed by the security protocol server 110 in some arrangements. Each of blocks 410-440 corresponds to one or more of the blocks 301-337.

At 410, the security protocol server 110 establishes a secure session. The session object is associated with the secure session. In some arrangements, the session object is an artifact corresponding to the secure session configured to enable the secure session to be re-verified at a later time.

At 420, the security protocol server 110 generates a recovery key from a first initial key based on the recovery key sequence number. The recovery key is unique to the secure session because it is generated using a designated number of iterations of the first function (F) and one or more iterations of the second function (G), with the first initial key as input. The recovery key sequence number corresponds to a number of times that secure sessions have been established since the first initial key is received from the recovery server 120.

In some arrangements, generating the recovery key includes executing the first one-way function (F) with a previous internal key as input to determine an internal key. The previous internal key is an output of the first one-way function (F) for a previous secure session. The previous internal key is determined by executing the first one-way function (F) one or more times with the first initial key as input. A second one-way function (G) is executed one or more times with the internal key as input to determine the recovery key.

In some arrangements, the recovery key is generated by executing the first one-way function (F) a number of times with the first initial key as input to determine the internal key. The number equals to the recovery key sequence number. A second one-way function is executed one or more times with the internal key as input to determine the recovery key.

At 430, the security protocol server 110 encrypts the session object with the recovery key to generate an encrypted session object. At 440, the security protocol server 110 sends the encrypted session object to the recovery server 120 for recovery.

In some arrangements, the security protocol server 110 establishes another secure session, which uses another session object. The security protocol server 110 generates another recovery key from the first initial key based on the recovery key sequence number (which is greater than the previous recovery key sequence number since another secure session is established by the security protocol server 110). The security protocol server 110 generates the another recovery key by executing the first one-way function with the internal key as input to determine a subsequent internal key and executing the second one-way function one or more times with the subsequent internal key as input to determine the another recovery key. The another recovery key is unique to the another secure session. The security protocol server 110 encrypts the another session object with the another recovery key to generate another encrypted session object. The security protocol server 110 sends the another encrypted session object to the server for recovery.

Figure 5:
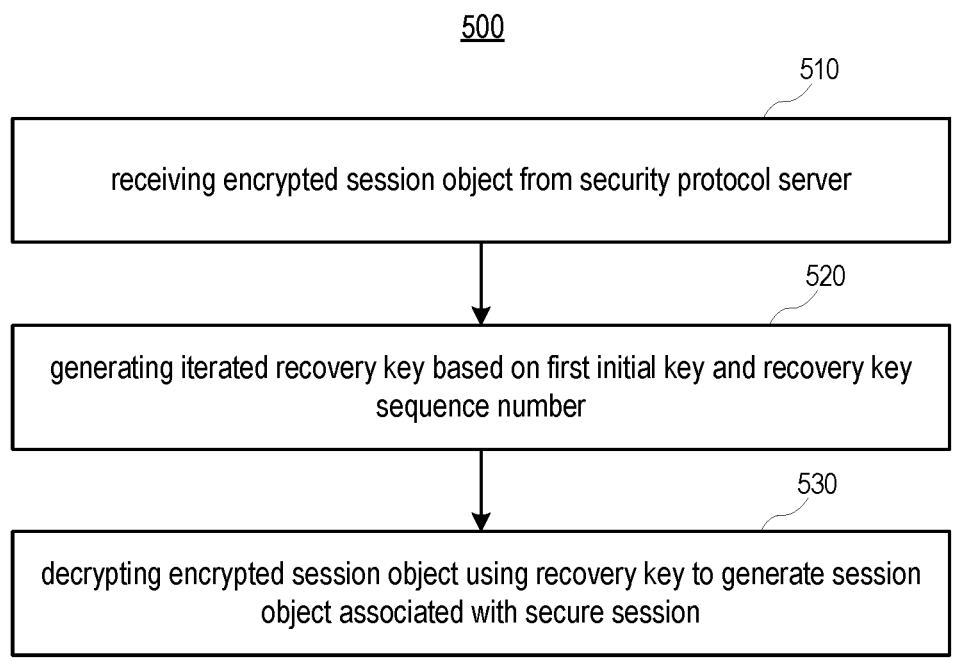
FIG. 5 is a flow diagram illustrating a method for recovering a session object, according to various arrangements.

FIG. 5 is a flow diagram illustrating a method 500 for recovering a session object, according to various arrangements. Referring to FIGS. 1-5, the method 500 is executed by the recovery server 120 in some arrangements. Each of blocks 510-530 corresponds to one or more of the blocks 301-337.

At 510, the recovery server 120 receives an encrypted session object from the security protocol server 110. The encrypted session object is unique to the secure session.

At 520, the recovery server 120 generates an iterated recovery key based on a first initial key and a recovery key sequence number. As described, the first function (F) is iterated one or more times (e.g., N) with $IK_0$ as input to generate $IK_N$ 310, where N is the recovery key sequence number to generate the recovery key sequence number corresponds to a number of times that secure sessions have been established since the first initial key is received by the security protocol server 110. The recovery server 120 generates the first initial key by encrypting a unique identifier (ID) with a BK. The first initial key is sent to the security protocol server 110 before the secure session is established by the security protocol server 110. The unique ID and the recovery key sequence number can be received from the security protocol server 110 in some arrangements. The first initial key can be generated by encrypting the ID with the BK responsive to receiving the encrypted session object.

Generating the recovery key includes executing the first one-way function (F) a number of times with the first initial key as input to determine an internal key. The number equals to the recovery key sequence number. A second one-way function can be executed one or more times with the internal key as input to determine the recovery key.

At 530, the recovery server 120 decrypts the encrypted session object using the recovery key to generate the session object associated with the secure session. The recovery server 120 re-negotiates the recovered session object using a combination of static and ephemeral keys.

In some arrangements, the method 500 further comprises receiving, by the recovery server 120, another encrypted session object from the security protocol server 110. The another encrypted session object is unique to another secure session. The recovery server 120 generates another recovery key based on the first initial key and the recovery key sequence number. The recovery server 120 decrypts the encrypted session object using the recovery key to generate the another session object associated with the another secure session.

In some situations in which the security protocol server 110 is not connected to the recovery server 120 temporarily, the security protocol server 110 may store the encrypted session objects (e.g., $E_1$ 316 and $E_N$ 330) locally store those encrypted session objects in the session database 208 or another suitable device/service. The recovery server 120 may retrieve the encrypted session objects from the session database 208 or another suitable device/service when the security protocol server 110 and the recovery server 120 become connected again. In some cases, the recovery server 120 may retrieve the encrypted session objects on-demand from the session database 208 or another suitable device/service when the security protocol server 110 and the recovery server 120 become connected. In some cases, the security protocol server 110 may forward the encrypted session objects that have not been yet sent to the recovery server 120 to the recovery server 120. In one example relating to an Internet of Things (IoT) device, the number of sessions may be few enough such that the encrypted session objects can be stored locally in a circular file. In such examples, only encrypted session objects associated with a predetermined number of last sessions are recoverable. The predetermined number may be based on storage capacity of the IoT device.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for recovering a session object associated with a secure session established by a security protocol server, the method comprising:
    establishing, by the security protocol server, the secure session, wherein the session object is associated with the secure session;
    counting, by the security protocol server, a number of prior secure sessions established since a first initial key is received from a recovery server;
    determining, by the security protocol server, a recovery key sequence number corresponding to the number of prior secure sessions;
    generating, by the security protocol server, a recovery key from the first initial key based on the recovery key sequence number, wherein the recovery key is unique to the secure session;
    encrypting, by the security protocol server, the session object with the recovery key to generate an encrypted session object; and
    sending, by the security protocol server, the encrypted session object to the recovery server for recovery.

2. The method of claim 1, wherein the sessions object is an artifact corresponding to the secure session configured to enable the secure session to be re-verified at a later time.

3. The method of claim 1, wherein:
    the encrypted session object is sent to the recovery server in real time; and
    the sessions object is an artifact corresponding to the secure session configured to enable the secure session to be re-verified in real time.

4. The method of claim 1, wherein generating the recovery key comprises:
    executing a first one-way function with a previous internal key as input to determine an internal key, wherein the previous internal key is an output of the first one-way function for a previous secure session; and
    executing a second one-way function with the internal key as input to determine the recovery key.

5. The method of claim 4, wherein the previous internal key is determined by executing the first one-way function one or more times with the first initial key as input.

6. The method of claim 4, further comprising:
    establishing, by the security protocol server, another secure session, wherein the another secure session uses another session object;
    generating, by the security protocol server, another recovery key from the first initial key based on the recovery key sequence number, wherein the another recovery key is unique to the another secure session, and the recovery key sequence number corresponds to the number of times that secure sessions have been established since the first initial key is received from the recovery server;

encrypting the another session object with the another recovery key to generate another encrypted session object; and sending, by the security protocol server, the another encrypted session object to the recovery server for recovery.

7. The method of claim 6, wherein generating the another recovery key comprises:

executing the first one-way function with the internal key as input to determine a subsequent internal key; and executing the second one-way function with the subsequent internal key as input to determine the another recovery key.

8. The method of claim 4, wherein the first one-way function and the second one-way function are different.

9. The method of claim 4, wherein each of the first one-way function and the second one-way function is a Secure Hash Standard (SHS) function or a Hash-based Message Authentication Code (HMAC) function.

10. The method of claim 1, wherein generating the recovery key comprises:

executing a first one-way function a number of times with the first initial key as input to determine an internal key, wherein the number equals to the recovery key sequence number; and executing a second one-way function with the internal key as input to determine the recovery key.

11. The method of claim 1, further comprising sending the recovery key sequence number to the recovery server.

12. The method of claim 1, further comprising:

storing the encrypted session object in a database; and sending the encrypted session object to the recovery server at a later time.

13. A security protocol server, comprising:

a network interface; and a processing circuit configured to:

establish a secure session, wherein the session object is associated with a secure session established by the security protocol server;

count a number of prior secure sessions established since a first initial key is received from a recovery server;

determine, by the security protocol server, a recovery key sequence number corresponding to the number of prior secure sessions;

generate a recovery key from the first initial key based on the recovery key sequence number, wherein the recovery key is unique to the secure session;

encrypt the session object with the recovery key to generate an encrypted session object; and send the encrypted session object to the recovery server for recovery.

14. A non-transitory computer-readable medium of a security protocol server storing computer-readable instructions such that, when executed, causes a processor to:

establish a secure session, wherein the session object is associated with a secure session established by the security protocol server;

count a number of prior secure sessions established since a first initial key is received from a recovery server;

determine, by the security protocol server, a recovery key sequence number corresponding to the number of prior secure sessions;

generate a recovery key from the first initial key based on the recovery key sequence number, wherein the recovery key is unique to the secure session;

encrypt the session object with the recovery key to generate an encrypted session object; and send the encrypted session object to the recovery server for recovery.

15. A method for recovering a session object associated with a secure session established by a security protocol server, the method comprising:

receiving, by the recovery server, an encrypted session object from the security protocol server, wherein the encrypted session object is unique to the secure session;

receiving, by the recovery server from the security protocol server, a counter indicating a number of prior secure sessions established since a first initial key is sent to the security protocol server:

determining, by the recovery server, a recovery key sequence number corresponding to the number of prior secure sessions;

generating, by the recovery server, a recovery key based on the first initial key and the recovery key sequence number; and decrypting, by the recovery server, the encrypted session object using the recovery key to generate the session object associated with the secure session.

16. The method of claim 15, further comprising:

generating the first initial key by cryptographically deriving the first initial key from a unique identifier (ID) using a base key; and sending the first initial key to the security protocol server before the secure session is established by the security protocol server.

17. The method of claim 16, further comprising receiving the unique ID and the recovery key sequence number from the security protocol server.

18. The method of claim 15, wherein generating the recovery key comprises generating the first initial key by encrypting a unique identifier (ID) with a base key responsive to receiving the encrypted session object.

19. The method of claim 18, wherein generating the recovery key further comprises:

executing a first one-way function a number of times with the first initial key as input to determine an internal key, wherein the number equals to the recovery key sequence number; and executing a second one-way function with the internal key as input to determine the recovery key.

20. The method of claim 15, further comprising:

receiving, by the recovery server, another encrypted session object from the security protocol server, wherein the another encrypted session object is unique to another secure session;

generating, by the recovery server, another recovery key based on the first initial key and the recovery key sequence number; and decrypting, by the recovery server, the encrypted session object using the recovery key to generate the another session object associated with the another secure session.

21. The method of claim 15, further comprising re-negotiating a key scheme for the session object.

22. A recovery server, comprising:

a network interface; and a processing circuit configured to:
- receive an encrypted session object from a security protocol server, wherein the encrypted session object is unique to a secure session established by the security protocol server;
- receive a counter indicating a number of prior secure sessions established since a first initial key is sent to the security protocol server;
- determine a recovery key sequence number corresponding to the number of prior secure sessions;
- generate a recovery key based on the first initial key and the recovery key sequence number; and
- decrypt the encrypted session object using the recovery key to generate the session object associated with the secure session.

23. A non-transitory computer-readable medium of a recovery server storing computer-readable instructions such that, when executed, causes a processor to:
- receive an encrypted session object from a security protocol server, wherein the encrypted session object is unique to a secure session established by the security protocol server;
- receive a counter indicating a number of prior secure sessions established since a first initial key is sent to the security protocol server;
- determine a recovery key sequence number corresponding to the number of prior secure sessions;
- generate a recovery key based on the first initial key and the recovery key sequence number; and
- decrypt the encrypted session object using the recovery key to generate the session object associated with the secure session.

* * * * *